Nov. 14, 1972    M. A. FAGET    3,702,688

SPACE SHUTTLE VEHICLE AND SYSTEM

Filed Jan. 4, 1971    6 Sheets-Sheet 1

MAXIME A. FAGET
Inventor by W.A. Marcontell
Attorney

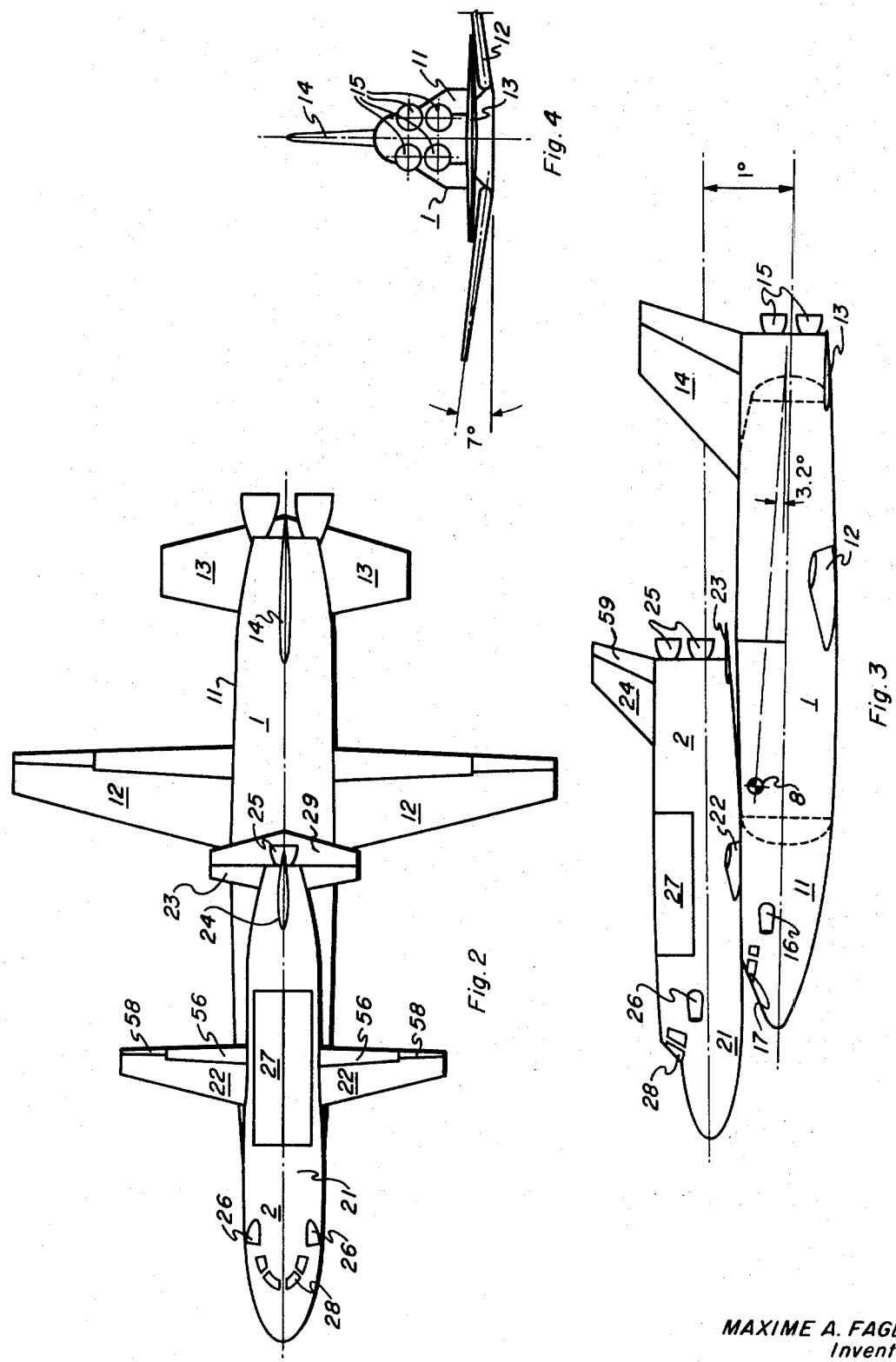

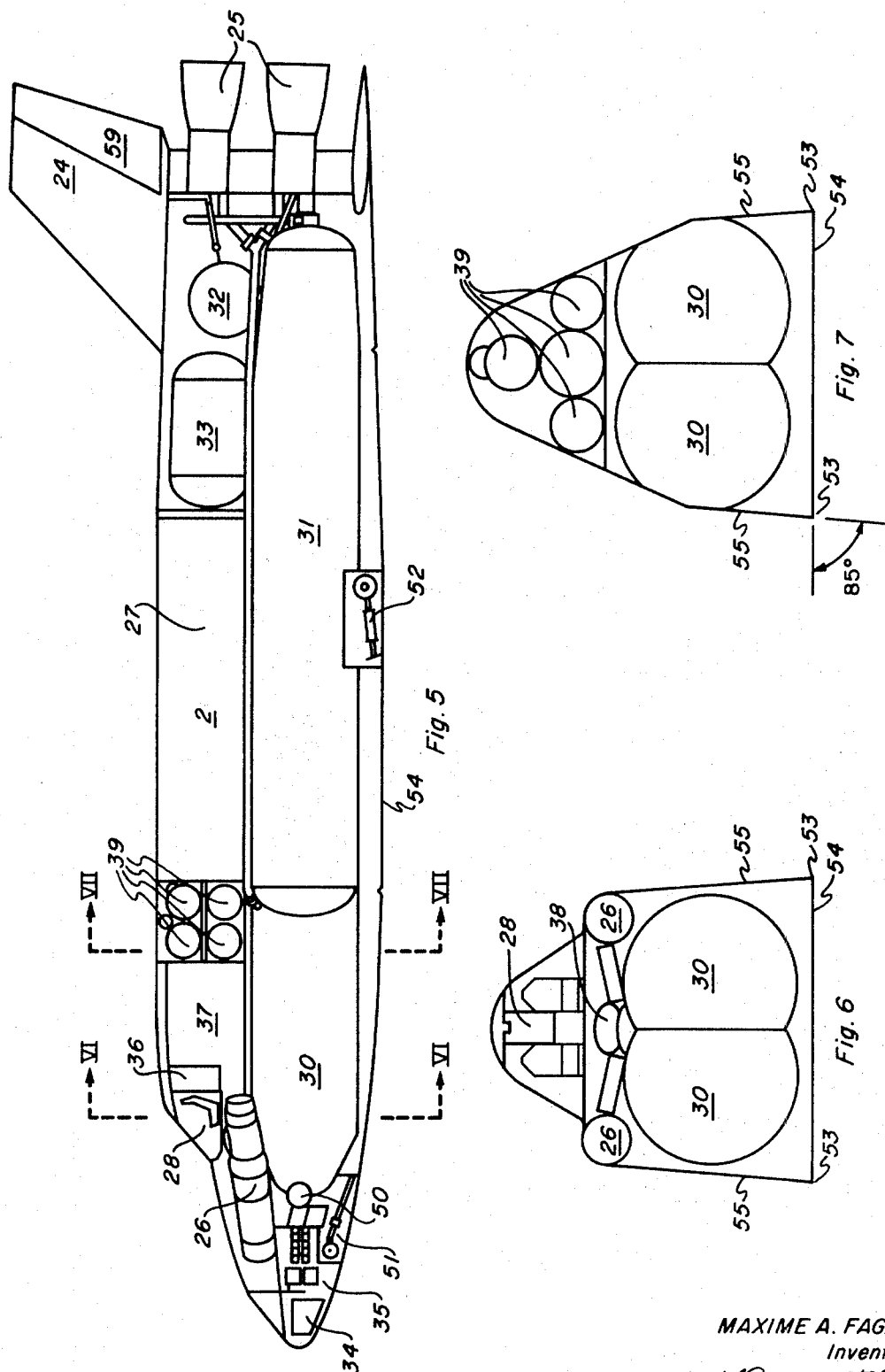

Nov. 14, 1972 M. A. FAGET 3,702,688
SPACE SHUTTLE VEHICLE AND SYSTEM
Filed Jan. 4, 1971 6 Sheets-Sheet 4
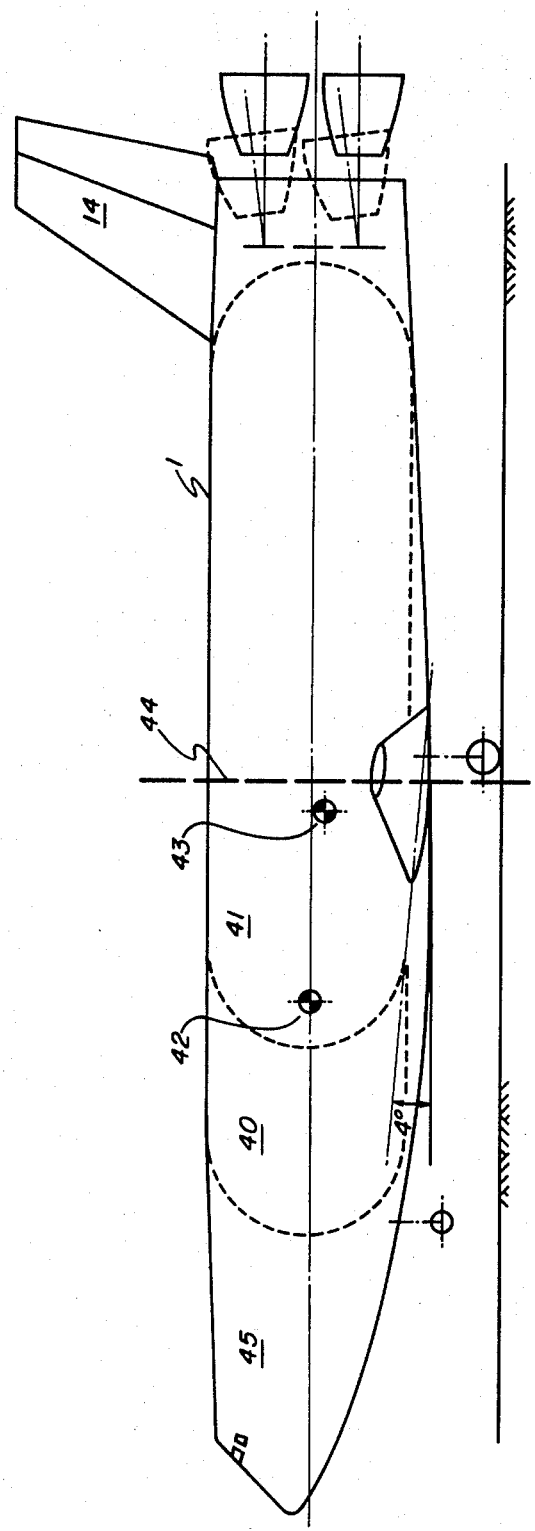
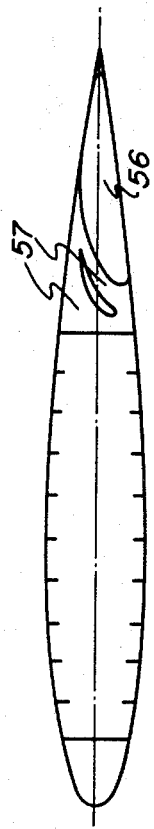
MAXIME A. FAGET
Inventor

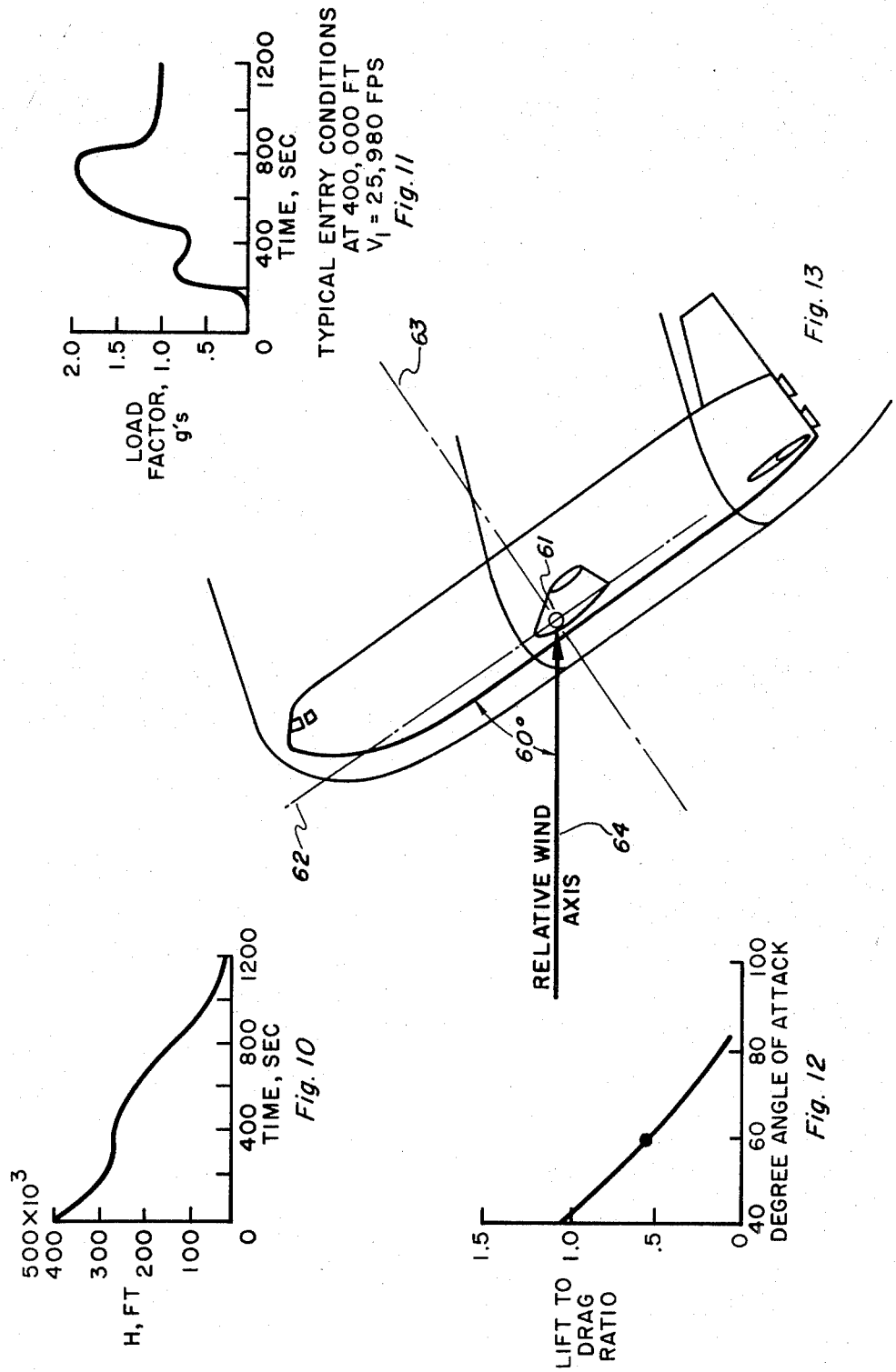

Nov. 14, 1972     M. A. FAGET     3,702,688
SPACE SHUTTLE VEHICLE AND SYSTEM
Filed Jan. 4, 1971     6 Sheets-Sheet 6
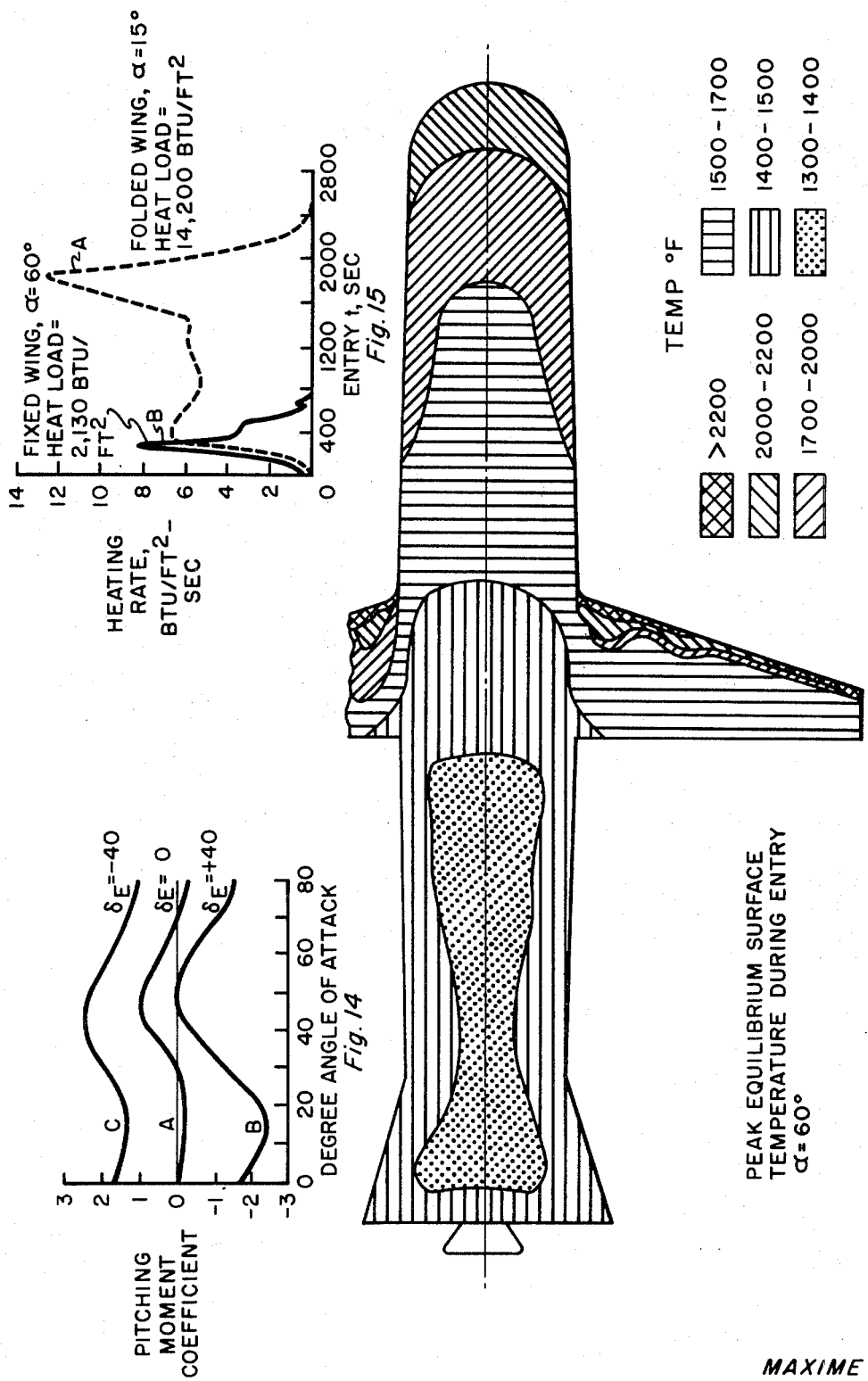
MAXIME A. FAGET
Inventor
by W.H. Marcontell
Attorney

United States Patent Office 3,702,688
Patented Nov. 14, 1972

3,702,688
SPACE SHUTTLE VEHICLE AND SYSTEM
Maxime A. Faget, Dickinson, Tex., assignor to the United States of America as represented by the Administrator of the National Aeronautics and Space Administration
Filed Jan. 4, 1971, Ser. No. 103,551
Int. Cl. B64c 37/02
U.S. Cl. 244—155                                17 Claims

ABSTRACT OF THE DISCLOSURE

A space shuttle system comprising two reusable stages, joined "piggyback" fashion for lift-off, each stage being a manual attitude controlled vehicle having fixed, aerodynamic support and control surfaces for horizontal atmospheric flight and conventional, near stall, aircraft landings. The fuselage bottom surface of each stage is transversely relatively flat and longitudinally cambered to provide dynamic lift at hypersonic atmosphere re-entry velocities and high angles of attack. Newtonian fluid flow states over bottom surfaces and the dispersion of flow stagnation regions over large areas hold vehicle surface temperatures during re-entry to tolerable levels. Other aerodynamic criteria are balanced so that each stage will have stable flight characteristics at both high and low attack angle attitudes during both the re-entry and the subsonic atmospheric flight phases.

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

(1) Field of the invention

The present invention relates to aerospace vehicles suitable for carrying substantial payloads beyond the earth's atmosphere and for return therefrom.

Also disclosed is a technique of combining at least two reusable aero-space vehicles of the type described for the launch of large payloads to earth orbital altitudes and beyond.

Moreover, the present invention contemplates a logistical support method for constructing and sustaining artificial satellites in orbit.

(2) Description of the prior art

Historically, rocket propelled vehicles have been, for the most part, unmanned ballistic devices. Flight path control has been largely limited to the ascent trajectory; the sensory function of control being performed by pre-programmed, automatic, inertial guidance systems. So long as the exclusive purpose of a rocket shot was to occasionally deliver an inanimate and expendable article to the outer reaches of the atmosphere or the depths of space, such one-way transit was satisfactory and practicable.

With the advent of human activity in space, however, it became necessary to devise reliable return devices and techniques. Such techniques include that of U.S. Pat. No. 3,093,346 to M. A. Faget et al., which discloses a space capsule for human occupancy of the type used in the manned ventures beyond the earth's atmosphere to date. Although vehicles of the Faget et al. type have proven most satisfactory for early space missions of limited scope, such craft have relatively little lateral maneuverability after re-entry into the atmosphere and are incapable of controlled, horizontal landing. Accordingly, precise landing points are impossible to predetermine and parachutes are necessary for the final few hundred feet of descent.

The next generation of space activity will be focused on the construction and support of large manned satellites or interplanetary vehicles. Since the present and foreseeable future states of the space vehicle propulsion art are restricted by practical payload limits and costs, multiple freight and passenger sorties are therefore necessary. Accordingly, the past practice of a large inventory of single mission, expendable vehicles in various sizes, is a luxury that can no longer be tolerated. Specifically, it is necessary to reduce both payload costs and increase operational flexibility.

To achieve this end, it is necessary to develop vehicles having operational efficiencies equally high in both space and atmospheric phases. Such vehicles must be capable of carrying large payloads to orbital altitudes; non-destructively surviving re-entry stresses; sufficient aerodynamic flight characteristics (including stability and control) to land at a predetermined point without external assistance; and minimum service, fueling, and preparation down-time antecedent to re-deployment.

Among the concepts suggested by the prior patent art and other literature are the disclosures of: Phillips, U.S. Pat. No. 3,104,079, a fixed delta wing vehicle having stowable auxiliary lifting surfaces and elevons; Kehlet et al., U.S. Pat. No. 3,090,580, a lenticular vehicle having stowable aerodynamic control surfaces; and Eggers et al., U.S. Pat. No. 3,276,722, a "lifting body" vehicle. Common limitations of these vehicles, however, are development and operational costs and the fact that they are not suitable for first stage booster service.

Another prior art concept is that of U.S. Pat. No. 3,369,771 to Walley et al., which is directed to a particular recoverable booster design and system of multiple stage deployment. The Walley et al. invention includes a delta winged booster vehicle having a lifting body fuselage that may be used in one of several launch modes as either a booster or orbiter craft. Although the mission objective of Walley et al. is similar to that of the present disclosure, the distinctions between respective vehicles are of a substantial and primary nature for reasons to subsequently be made more apparent.

SUMMARY OF THE INVENTION

The present invention describes primary vehicle design and operational parameters of a reusable shuttle system for transport of passengers and cargo from the earth's surface to orbit and return. Such spacecraft parameters specify a conventionally appearing aircraft having fixed wing panels and empennage secured in fixed position to a voluminous fuselage. Total area of the vehicle bottom profile is substantially equally divided between the fuselage and the wing-empennage group. Particularly distinctive from the prior art is the fuselage bottom geometry. For reasons of stability and surface heat distribution, the fuselage bottom is relatively transversely flat, forming relatively small radius chines at the juncture with the side panels. Moreover, the interior angle formed between the mean planes of said bottom and side panels is less than 90°.

A unique aerodynamic characteristic of the fixed geometry vehicle disclosed herein is that the stabilizing forces about the three stability axes remain relatively constant throughout the re-entry regime from high hypersonic, high angle of attack to low subsonic, low angle of attack without anomalous moments and interactions in the middle Mach numbers and transonic flight regions. Such moment anomalies and instability interactions are common to all winged and lifting body vehicles previously proposed as re-entry configurations. This characteristic is exploited by the subject vehicle to provide simple, straightforward control—one control means for re-entry and one for subsonic flight.

Contributing criteria to the aforedescribed characteristic are that the subject vehicle have both high and low angle of attack trim stability in both hypersonic and subsonic flight phases and sufficient pitch control to drive the vehicle from one stable attitude to the other. More particularly, as determined about the vehicle axes, the present invention provides for positive static roll, pitch, and yaw stability throughout the operational velocity regime. As resolved about the re-entry trajectory axis, however, i.e., an axis parallel with the relative wind, the subject vehicle has neutral static yaw stability.

Longitudinally, the fuselage bottom is ski-shaped. At the high attack angle trim point, where the wings and empennage are fully stalled, lift per unit area of fuselage is substantially equal to that of the wing-empennage group.

When used as a space transport system, two vehicles having the foregoing characteristics are joined together as first and second stages. More appropriately, the larger, first stage vehicle will hereafter be identified as the booster and the smaller, second stage vehicle as the orbiter, either of which may be characterized as a "shuttle vehicle." Relative assembly of the two vehicles for launching is to secure the orbiter bottom to the booster top, well forward of the booster pitch axis. Such disposition provides straightforward staging with good provisions for launch-load transmission between stages.

Initial ascent of the compound vehicle from an earth base is from the vertical launch position. Ascent power is provided by rocket engines positioned in the booster fuselage extreme aft end. For a launch weight of approximately 2.5 million lbs. and 25,000 lbs. orbit payload weight, staging should occur at approximately 10,000 f.p.s. While the orbiter vehicle continues under independent rocket power, the booster re-enters the atmosphere, decelerates to subsonic velocity, and makes a transitional maneuver into subsonic flight. It then either glides or cruises under turbojet power, back to land at the launch site.

The orbiter ascent trajectory delivers the loaded vehicle to the altitude and velocity vector definitive of the desired orbit where the primary engines are extinguished. While in orbit, the orbiter payload is removed. If a previously orbiting payload is to be returned to earth, said returning payload is positioned within the orbiter bay or appropriately attached to the orbiter top side. Retro engines are momentarily started to decelerate the vehicle to an acceptable re-entry velocity. Re-entry, transition and return flight of the orbiter is similar to that of the booster.

In this manner, many payload types such as satellites or sub-components of large structures such as permanent space stations or interplanetary vehicles may be placed in orbit by repeated sorties of the same shuttle vehicles. Of paramount significance is the fact that no structural portion of the delivery system is expended or abandoned. Moreover, substantial savings over prior systems may be gained in the developmental phase of the present invention by virtue of the fact that subsonic flight tests may be initiated from conventional airport takeoffs. Expendable prototypes for high altitude, vertical launch tests are eliminated. It is entirely possible that an original prototype may evolve into an operational "line" item.

BRIEF DESCRIPTION OF THE DRAWINGS

Relative to the drawings wherein like reference characters designate like or corresponding parts throughout the several views;

FIG. 2 is a plan view of the booster and orbiter vehicles combined in ascent configuration;

FIG. 3 is a side elevation view of the booster and orbiter vehicles combined in ascent configuration;

FIG. 4 is an aft end elevation of the booster vehicle;

FIG. 5 is a schematic cross-sectional side elevation of the orbiter vehicle;

FIG. 6 is a schematic cross-sectional end elevation of the orbiter vehicle taken from plane VI—VI of FIG. 5;

FIG. 7 is a schematic cross-sectional end elevation of the orbiter vehicle taken from plane VII—VII of FIG. 5;

FIG. 8 is a schematic cross-sectional side elevation of the booster vehicle;

FIG. 9 is a cross-sectional end elevation of a typical shuttle vehicle wing;

FIG. 10 is a graph representing the locus of altitude-time coordinates during a typical atmospheric re-entry of a shuttle vehicle;

FIG. 11 is a graph representing the locus of deceleration force-time coordinates during a typical atmospheric re-entry of a shuttle vehicle;

FIG. 12 is a graph representing the locus of lift/drag-attack angle coordinates of a typical shuttle vehicle;

FIG. 13 is a schematic representation of a shuttle vehicle in the initial atmospheric entry phase depicting pitch attitude and fluid flow pattern;

FIG. 14 is a graph representing the locus of pitching moment coefficient-attack angle coordinates respective to three positions of the vertical stabilizer;

FIG. 15 is a graph representing the locus of shuttle vehicle surface heating rate-time coordinates during a typical atmospheric re-entry of two shuttle vehicle designs having different $L/D$ characteristics; and FIG. 16 is a schematic bottom plan of a shuttle vehicle depicting the re-entry heat distribution.

DESCRIPTION OF THE PREFERRED EMBODIMENT

Figure 1:
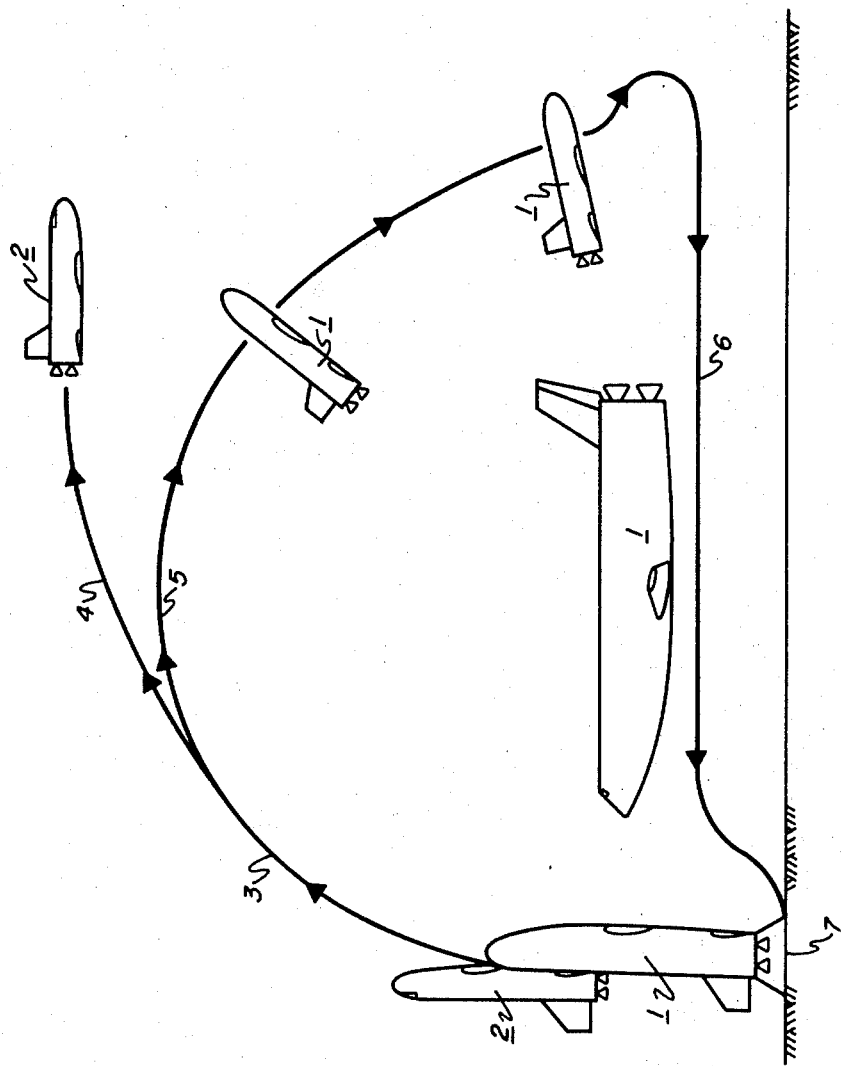
FIG. 1 is a schematic representation of the invention vehicles and method of deployment.

Due to mission objectives of the next generation of manned space activity, the present invention comprehends the logistical transport and support system shown in FIG. 1 wherein a second stage or orbiter vehicle 2 is secured piggyback fashion to a first stage or booster vehicle 1 for launch from a vertical position.

Numerical criteria of the system described herein are predicated on the following booster and orbiter specifications. It should be understood, however, that the following specifications are neither limiting or exclusive but merely representative of a possible combination and are stated only as an example.

|  | Orbiter | Booster |
| --- | --- | --- |
|  | Weight × 1000 lb. | |
| Launch weight | 360.0 | 1,132.0 |
| Weight at insertion/burnout | 97.2 | 180.0 |
| Payload | 12.5 | |
| Combined liftoff weight | 1,492.0 | |
| Main engine thrust | 468.0 | 1,940.0 |
| Crew | 2 | 2 |
| Passengers | 10 | |
| Payload volume, ft.$^3$ | 2,000 | |

The ascent trajectory 3 of the composite vehicle carries the orbiter 2 to a selected staging velocity. Since the booster engines provide all thrust from lift-off to staging, both vehicles being functionally independent, all fuel consumption up to the staging point is from the booster 1 tankage.

When staging occurs, the orbiter 2 is thrust free and clear of the booster 1 whereupon the orbiter main engines are started. Thereafter, the orbiter 2 is propelled along the orbit injection trajectory 4.

After separation from the orbiter 2, the main engines of the booster 1 are extinguished thereby allowing the earth gravitational field to pull the booster 1 back into the atmosphere along the re-entry path 5. Re-entry attitude of approximately 60° angle to the relative wind is sustained throughout entry at the end of which the angle of attack is reduced to about 20°, the normal subsonic flight attitude.

After the booster is returned to normal subsonic flight attitude, air breathing auxiliary engines are started to sustain altitude with aerodynamic lift for the base return flight 6.

Final recovery at base 7 is a conventional, near stall, wheel landing.

Since the booster 1 is designed, as hereafter explained, to suffer no structural degradation due to the preceding sub-orbital flight and re-entry, only minimum maintenance is necessary for deployment in addition to vertical erection, loading, fueling, and replenishment of crew life-support consumables.

The orbiter 2, being the payload carrying vehicle of the system, delivers same to the desired station for removal from a payload bay. Thereafter, retro engines, not shown, are briefly started to reduce the orbiter velocity below a critical orbit velocity so that re-entry and return to base 7 in the same manner as booster 1 may be effected.

Relative to the booster and orbiter vehicle characteristics and construction details, reference is first made to FIGS. 1–3. Booster 1 comprises a fuselage 11, fixed positioned wings 12, horizontal stabilizer 13, vertical stabilizer 14, primary propulsion rocket engines 15, and auxiliary propulsion turbojet engines 16.

The orbiter 2, in many respects, is a smaller version of the booster vehicle having fuselage 21, fixed wings 22, horizontal stabilizer 23, vertical stabilizer 24, primary propulsion engines 25, and auxiliary engines 26. In addition, orbiter 2 is provided with a top opening, large volume, payload receiving bay 27.

Both booster and orbiter vehicles may be manually controlled and provided with crew compartments 17 and 28 respectively.

Some internal details of booster 1 are illustrated by dashed lines in FIG. 8 where the main engine propellant tanks 40 and 41 are shown to occupy most of the internal fuselage volume. Appreciable weight savings may be gained by integrating the tank and primary vehicle structure where possible. For a liquid oxygen-hydrogen propellant system, the greater density component, oxygen, would be stored in the forward tank 40 with the lighter propellant, hydrogen, in the aft tank 41. This arrangement allows aerodynamic stability of the vehicle during the boost flight phase. When all tanks are full, the resultant vehicle center of gravity will be positioned ahead of the center of pressure located in the proximity of plane 44.

It should be recalled that "center of pressure" is a theoretical aerodynamic concept wherein all aerodynamic forces acting upon a vehicle may be resolved about a point as a resultant lift and drag vector and without resultant aerodynamic moment.

In the booster fuselage section 45 forward of the oxygen tanks 40 is disposed the crew compartment 17, navigational equipment, auxiliary propulsion engines 16, jet fuel, and fuel for attitude control engines. The attitude control engines (not shown) are small, low thrust reaction engines located in the tips of opposite wing panels and the fore and aft ends of the fuselage 11 for controlling the vehicle flight attitude during re-entry when mechanical surface controls are ineffective.

The orbiter vehicle 2, having a more complex interior, is shown with greater detail by FIGS. 5–7. As in the booster, oxygen tanks 30 are located ahead of the center of pressure with the hydrogen tanks 31 occupying the lower aft volume of the fuselage. Propellants from tanks 30 and 31 fuel the main engines 25 during the orbit insertion trajectory 4 (FIG. 1). For on-orbit and interorbit propulsion, additional fuel is stored in tanks 32 and 33 which are high efficiency cryogenic storage vessels suitable for maintaining oxygen and hydrogen in the low temperature liquid state for long time periods.

In the nose of the orbiter fuselage 21, ample space is provided for guidance and control equipment 34 and electric power supply equipment 35. The space 36 immediately aft of the crew compartment 28 is convenient for tracking, telemetry, and communication equipment. Passenger space may be provided at 37 thereby limiting the environmentally controlled volume to the composite of spaces 28, 36, and 37. Environmental control equipment 38 may be conveniently positioned beneath the crew compartment 28.

Between the passenger space 37 and payload bay 27, auxiliary tankage 39 for attitude control engine propellants and the environmental control system may be secured with additional auxiliary tankage positioned in the region 50.

Current designs of the present system contemplate positioning air-breathing, auxiliary propulsion, turbine engines 26 in the fuselage nose section as illustrated, but an attractive alternative is to place the engines 26 on the upper or "shaded" face of wings 22 in protective nacelles. Other embodiments of the present invention omit the air-breathing engines entirely and rely upon the gliding cross-range of the vehicle throughout the subsonic return flight 6. This glider version of the invention accepts certain risks of loss, however, due to the fact that landings must be executed successfully in the first approach, no go-around capacity being available. Glider and sailplane experience have proven such risks to be entirely reasonable and acceptable, though.

Since the capacity for horizontal landings on conventional airport runways is a primary objective of the present shuttle system, retractable landing gear and wells therefor are provided in the fuselage structure at 51 and 52.

The following structural and aerodynamic design parameters are relevant to both vehicles of the invention. To reduce descriptive redundancy therefore, further references will be limited to the orbiter 2.

Aerodynamically, the factors of positive and neutral static stability is the initial tendency of a body to return to an equilibrium attitude following a disturbance. Representative of positive static stability is a spherical mass disposed within a bowl of spherical radius greater than that of the mass. Equilibrium position for the mass in a gravity environment is at rest in the bottom of the bowl. An external force disturbance to displace the mass from said equilibrium position is resisted by gravitational forces.

Neutral static stability may be defined as the tendency of a body to remain in equilibrium in a new position following a disturbance from an initial equilibrium position. This quality is represented by a spherical mass placed on a level surface in a gravity environment. The sphere will remain in any position on the surface to which it is displaced.

About the vehicle pitch axis, in the low or 20° angle of attack attitude, positive static stability is conventionally achieved by a discretely arranged relation between the vehicle center of gravity and the center of pressure as dictated by longitudinal positionment of the wing. Decalage between the wing and horizontal stabilizer provides an inherently correct stabilizing moment tending to restore the vehicle to the low angle of attack equilibrium attitude.

At the high (60°) re-entry attack angle attitude, the present vehicle represents a substantial departure from the prior art to achieve positive static pitch stability. In the first place, most of the bottom profile surface area—fuselage, wing and empennage—is arranged to "feel" substantially uniform pressure from the relative wind of re-entry. Accordingly, the vehicle fuselage 2 (FIG. 5) is constructed almost transversely flat along the bottom 54. Since, as stated previously, the total bottom wetted area of the wing-empennage group is substantially equal to that of the fuselage, it therefore follows that lift per unit bottom wetted area is substantially equally distributed thereover.

As a note of departure, concerning operational angles of attack, it should be understood that 60° is merely a convenient optimum for the high angle attitude. A more accurate, but elusively variable, definition of high attack angle for present purposes would be that pitch attitude at which the wings 22 are aerodynamically stalled. For the particular wing 22 described herein, stalling may occur at pitch attitudes exceeding 40° angle of attack.

Conversely, a low angle of attack is defined as a pitch attitude of less than 40° angle of attack or an operational condition whereat fluid flow over the wings 22 generates aerodynamic lift.

In view of such distinct fluid flow patterns respective to the two positions of pitch equilibrium, it is also important to point out the nature of lift relevant to said pitch attitudes. For this purpose, it is convenient to relate the functional distinctions between impulse and reaction turbine motors. The first absorbs the impact of the energizing fluid whereas the latter is driven by the reaction from an expanding, hence, accelerating fluid mass. Relating the above to this description, lift forces on the vehicle due to fluid impact at the high angle of pitch attitude will be characterized as dynamic lift whereas lift due to fluid acceleration will be characterized as aerodynamic lift.

Returning to the explanation of positive static pitch stability, it may now be seen that more static stability in the high angle attitude is a function of uniform pressure movement distribution about the pitch axis (shown as a circle 61 in FIG. 13 and extending perpendicular to roll axis 62 and yaw axis 63). This kind of stability is inherent with a flat plate of symmetric profile. Without additional control devices, however, such stability is statically negative. Imposition of any disturbing force will elicit an accelerating departure from the equilibrium position. For this reason, the present vehicle design provides a longitudinal curve to the bottom of the fuselage, at least at either extremity thereof. Other portions of the bottom of the fuselage may be substantially longitudinally flat, or may also have a gentle curvature. In the preferred embodiment, the curvature is greatest at the bow section, then substantially flat until the extreme aft section which exhibits a curve lesser than that of the bow. This design feature can best be seen in FIGS. 3, 5, and 13. The effect of this curve is to alter the local angle of attack to the relative wind along said curved portion at a rate differential to that of the remaining vehicle bottom area. Accordingly, the coefficient of pressure, a function of local angle of attack, is altered to provide restoring forces effective to return the vehicle to the equilibrium position. In other words, if the vehicle pitch attitude departs in the nose up direction, the coefficient of pressure on the flat bottom surfaces aft of the pitch axis increases at a greater rate than the cumulative result of those along the more greatly curved bow. Hence, a relative force increase is imposed on the aft side of the pitch axis 61 to cause a counteracting moment thereby driving the vehicle pitch attitude back to the equilibrium position.

Pitch departures in the nose down direction produce the opposite result to increase relative moment forces on the bow side of the pitch axis 61.

In summary, therefore, the curved bow of the present invention provides pitch angle restoring forces for positive pitch stability in the high angle operational mode with fixed structure and with no expenditure of control power.

The rate of curvature effects the rate of restoration, a function of dynamic stability, and should be analyzed in the context of other pitch motion damping forces.

Positive static roll stability relative to the vehicle axis 62 is more conventionally achieved by a dihedral relationship between the wing panels 22 and the fuselage 21. The 7° dihedral shown in FIG. 4 with respect to booster 1 is deemed adequate for both, re-entry and subsonic flight conditions. A dihedral angle to the horizontal stabilizer 23 will further contribute to positive static stability.

Conventional design practice is also exploited for positive static yaw stability about axis 63 in the low angle flight mode. Accordingly, the present design provides for an extreme aft mounted vertical stabilizer 24 and sweep to the wing leading edge.

The significance of positive static yaw stability, as resolved about the vehicle axis 63 in the high angle flight mode is nominal due to the near alignment of said vehicle yaw axis with the relative wind of re-entry. An angular displacement about the vehicle yaw axis 63 necessarily induces a roll disturbance in reference to the relative wind 64. There is, therefore, no need for a restoring force to return the vehicle attitude to an equilibrium position relative to a fixed yaw axis 63 reference. Since the vehicle has positive static stability about the vehicle roll axis, such vehicle axis related yaw merely induces a corrective roll to reposition said vehicle yaw axis.

As determined about an axis of reference 64 parallel with the relative wind, however, the present vehicle may be considered neutral in static yaw stability. This is to say that the vehicle will stabilize in any angular position of a plane including both the relative wind axis 64 and the vehicle roll axis 62 as said plane revolves about said relative wind axis 64. This may be better understood by envisioning the vehicle roll axis 62 as a straight line surface element of a regular cone revolved about the relative wind axis 64. By such analogy, the vehicle will remain in equilibrium at any position on the cone where all three axes; roll 62, yaw 63, and relative wind 64; lie in the same plane.

An interesting consequence of the foregoing is that relative to an earth gravitational reference, the vehicle may stabilize in an upside down re-entry attitude as well as right side up.

Width of the fuselage nose bottom 54 also contributes to neutral static yaw stability by attenuating or preventing destabilizing moments caused by fluctuating fluid flow fields and resultant side forces on the nose.

Selective attitude control of the present vehicle in the high angle flight mode is accomplished conventionally by small reaction engines (not shown) disposed in the wing tips and fuselage ends. Due to the inherent stability of the present vehicle, however, power and fuel reserve for such attitude control engines is substantially reduced from that required for comparable prior art designs.

Adjustable area structural panels such as flaps and elevons are not only ineffective in the early re-entry phases but use thereof in the high-heating re-entry phase would raise substantial thermodynamic difficulties.

As a special note of high angle attitude control, due to the strong interrelationship of roll stability and the relative wind axis 64 vehicle flight path may be selectively altered by sustaining an induced roll moment long enough to re-establish stable fluid flow against the new directional face of the bottom surface area.

In the low angle flight mode, ailerons 58 (FIG. 2), elevator 29, rudder 59 (FIG. 3) are the devices of selective attitude control. As to the elevator 29 in particular, sufficient area and deflection must be provided to drive the vehicle pitch attitude from the re-entry positive static equilibrium position of approximately 60° to a positive static equilibrium pitch attitude of approximately 20° for subsonic flight. Representative design parameters are illustrated by FIG. 14 where the two positions of static pitch stability are shown by curve A which corresponds a zero pitching moment coefficient with a zero elevator deflection angle at attack angles of 30° and 70° respectively. Reasonably symmetric responses are derived from the elevator 29 at deflection angles of 40° down (curve B) and 40° up (curve C) respectively, for smooth handling characteristics and firm response rates throughout the subsonic flight region.

Other design relationships between fuselage, wing and empennage of the present vehicle are consistent with conventional aircraft design practice and are selected for proven superior flying qualities at subsonic velocities and in approach and landing maneuvers.

For example, the airfoil section of wing 22 may be selected almost exclusively on the basis of optimization for subsonic cruise and landing. An NACA 0012-64 airfoil provided with low speed lift augmenting devices such as flaps 56 and slots 57 is shown in FIG. 9. The 40° angle of incidence for the wing shown in FIG. 8 is also conventional practice.

The straight wing shown in FIG. 2, is clearly the lightest planform for these requisite purposes but a delta planform offers other advantages.

Two functions of the broad, flat fuselage bottom 54 have been recited, i.e., positive pitch and neutral yaw static stabilities. At least two more flat bottom functions are to be added, i.e., re-entry rate control and heat management.

A body having the general physical characteristics of a space vehicle, entering earth bound atmosphere at a velocity of approximately 26,000 f.p.s., encounters sufficient atmospheric density at approximately 400,000 ft. altitude to start hypersonic heating. Vehicles having a Lift/Drag ratio ($L/D$) of 1.5 entering the atmosphere at said velocity and at a 15° angle of attack, generate a heating rate profile as is illustrated by dotted line curve A of FIG. 15. At this rate, temperatures on the surface of a folded wing, lifting body vehicle may reach as high as 3900° F. Such temperatures are beyond the present art state for load-carrying structural members and can be tolerated only by the use of ablative heat shields which not only impose weight penalties against the total lift-off payload but require replacement after each use. Moreover, vehicles with high $L/D$ ratios, e.g., 1.5, must sustain high heating rates for much longer time periods thereby compounding weight penalties due to the insulation required to maintain the primary interior structure temperatures within the useful range of material strength as the re-entering vehicle literally soaks in the blast furnace environment.

The large, uniformly loaded bottom surface area of the present invention enables the designer to capitalize on the advantages of a much lower $L/D$ ratio, e.g., 0.5, and thereby avoid the above problems of a higher $L/D$ ratio. By selecting vehicle design parameters so as to yield as $L/D$-attack angle relationship as represented by FIG. 12, a 60° re-entry angle of attack will produce the desired results. Not only is the re-entry heating profile substantially reduced in intensity and duration as shown by curve B of FIG. 15, but the re-entry deceleration profile is held well within the tolerable limits of most healthy persons as shown by FIG. 11. The slope of the FIG. 10 curve represents the altitude rate of descent.

It should be pointed out, however, that the thermal advantages of a low $L/D$ ratio are not purchased without consideration. In this case, the price paid is that of operating range. The vehicle to which FIG. 15, curve A, relates, having an $L/D=1.5$ for a re-entry angle of attack of 15° will have an operational cross-range of 2000 N.M. The present invention, having an $L/D=0.5$ and a re-entry angle of attack of 60°, follows the much shorter re-entry duration as depicted by curve B which allows an operational cross-range of only 200 N.M. However, such a sacrifice is not considered controlling in most circumstances since even 200 N.M. is adequate to reach a suitable airport for landing.

In determining the $L/D$ ratio for the re-entry flight phase, it should be recalled that at the 60° pitch attitude, the wing 22 is substantially if not completely stalled. Therefore, total vehicular lift in this attitude is attributable exclusively to the dynamic pressure against the bottom wetted surfaces of the fuselage, wing and empennage. Not until the vehicle descends to approximately 40,000 ft. and 300 f.p.s. velocity is the elevator 29 deflected down 30° (FIG. 14, curve C) to rotate the vehicle into a low angle of attack flight for generation of aerodynamic lift by fluid flow over the wing.

The 60° re-entry angle of attack has another desirable product in addition to consistency with an advantageous $L/D$ ratio. That pitch attitude in correlation with the flat bottom profile is also responsible for widely distributed flow stagnation regions over the vehicle bottom wetted area. Large areas of flow stagnation in relation to the total wetted area is a manifestation of Newtonian (laminar) free stream flow states across said bottom wetted surface.

The mechanics of restricting fluid flow across the bottom area to the laminar flow states include the generation of one or more shock stable waves of maximum magnitude preceding the vehicle throughout the hypersonic flight phase. Since the propagation of shock waves consumes large quantities of energy, it is possible by the aforedescribed configuration to dissipate a large percentage of the altitude and velocity energy potential of the present vehicle by such device. Those skilled in the art will appreciate the practical advantage of converting this energy to heat along the wave front at a discrete distance ahead of the vehicle structure per se.

Consistent with the laws of gas dynamics and conservation of energy, diffusion of atmospheric gas past the shock wave front converts a determinable percentage of the gas total energy from the dynamic state to the static state. In this respect, the shock wave phenomena functions as a compressor to convert the compressible medium from high relative velocity, low temperature and low static pressure to a condition of low relative velocity, high temperature and high static pressure. Unlike a compressor, however, total energy of the medium before and after passing the shock wave front is substantially unchanged. It is the post wave front high temperature consequence of these physical laws that cause re-entry vehicle designers greatest concern.

The present re-entry vehicle attack profile is designed to propagate one or more shock waves, the last of which sustains a relatively stable position at a discrete distance removed from the vehicle surface. Moreover, subsequent to diffusion past said last wave front, the flow velocity of the atmospheric gas should be reduced to near sonic or less. In this velocity region, gas flow states may be limited to the Newtonian (laminar) condition thereby minimizing heat transfer from the hot, post shock wave atmospheric gas as it flows over the vehicle bottom surface. There being little mixing of flow streams across the vehicle surface, the vehicle structure need only absorb that heat of the boundary layer wetting the vehicle surface which in turn, constitutes an effective insulating layer to inhibit heat transfer from flow streams more remote from the wetted surface. The substantially flat transverse profile of the fuselage bottom minimizes the distance traversed by such insulating flow streams from the inner or centered stagnation region laterally to the sharp chines 53 which cause the flow to thereafter separate from the vehicle surface. Accordingly, less opportunity is given the flow stream to accelerate to turbulent or mixing flow velocities thereby supporting the critical necessity of maintaining a laminar condition until the gas is completely separated from all vehicle surfaces. Of course, all heat energy released by the shock wave and not transferred back to the vehicle structure is left behind the vehicle to diffuse into the general atmosphere.

Results of the foregoing physics, as applied to the present vehicle, are illustrated by FIG. 16. Leading edges of aerodynamic surfaces having small radii of curvature are outside the stagnation regions where most of the heat transfer to the vehicle structure occurs. Therefore, no unreasonable heat concentration problems are presented. Under these circumstances, the maximum expected temperature is about 2400° F. along the wing root leading edge. Structural materials are presently available to accommodate this temperature without appreciable degradation of strength.

The 5° angle of relief (FIG. 7) at the sharp planar intersection of fuselage sides 55 with bottom 54 "shades" the vehicle side and top skin structure by causing fluid flow from the stagnation region to "peel" off sharply and cleanly, as explained previously. At the same time, the relatively small radius of the "hard chines" 53 minimizes the effect of side forces on the vehicle nose due to minor deviations in vehicle alignment with the flight path to cause destabilizing moments about the yaw axis 63.

Considering both, booster 1 and orbiter 2, as a single vehicular unit as illustrated by FIGS. 2 and 3, it is important that the unit be aerodynamically stable throughout the boost trajectory 3 (FIG. 1). Accordingly, the unit center of gravity 8 must be positioned ahead of the unit center of pressure, a theoretical function of lift, drag, and angle of attack. By attaching the orbiter 2 to the booster 1 topside well forward of the booster center of mass with a 1° centerline convergence angle, the resultant unit c.g. will fall along a 3.2° intersection line with the booster center line at the engine 15 thrust center. An engine gimbal envelope of only a few degrees is necessary to maintain thrust vector alignment with the unit c.g. 8.

This "piggyback" arrangement provides a number of other features not available in a tandem or side-by-side shuttle configuration. The interconnecting structure necessary for securing the two vehicles together may be compact and contained within the aerodynamic shape of respective vehicles. Separation requirements to preclude booster 1 damage prior to firing the orbiter 2 engines 25, are less stringent. Large dimension payload pods may be attached to the orbiter with minimum geometrical interference with the booster, a capacity also having re-entry advantages by protecting a recovery load from severe re-entry heating.

It should be understood that the drawings and specification set forth hereinabove present a detailed disclosure only of a preferred embodiment of the invention and that therefore the invention is not to be limited by the specific form disclosed.

What is claimed is:

1. An aircraft having fuselage and wing means:
   said fuselage having a longitudinally cambered, continuous bottom along the full length thereof, said bottom being substantially flat in the transverse direction whereby substantial impact lifting forces are generated against said bottom at flight angles of attack at and exceeding full stall;
   said wing means providing aerodynamic lifting forces at flight angles of attack of less than full stall and impact lifting forces at flight angles of attack at and exceeding full stall;
   the impact lifting force per unit area of said bottom at said flight angles of attack at and exceeding full stall substantially equaling the impact lifting force per unit area of said wing.

2. An aircraft as described in claim 1 wherein sides of said fuselage join said bottom at small angles of relief.

3. An orbital payload delivery system comprising:
   first and second vehicles, each having aerodynamic wings, attitude control surfaces, and fuselage; the bottom of said fuselage being longitudinally cambered and substantially transversely flat, the area of said fuselage bottom being substantially equal to the bottom area of said wings and control surfaces, collectively;
   said second vehicle having a payload receiving bay and removable cover therefor on the top side of said fuselage;
   said first and second vehicles adapted for releasable interconnection, the bottom of said second vehicle being secured to the top of said first vehicle for vertical ascent from a static base; and
   the gravity center of an interconnected unit comprising said first and second vehicles disposed ahead of the center of pressure of said unit.

4. The orbital payload delivery system of claim 3 wherein said unit gravity center lies along the thrust center of first vehicle primary propulsion engines.

5. The orbital payload delivery system of claim 3 wherein said second vehicle fuselage is adapted for releasable interconnection with a payload to the external topside thereof, said payload being protected by said fuselage from environmental extremes during atmospheric re-entry.

6. An aircraft having a fuselage and aerodynamic wings and control surfaces;
   the bottom of said fuselage being substantially transversely flat with full stall pitch stabilizing means comprising fixed structure of cambered profile;
   large area fluid flow stagnation regions formed on said fuselage, wing and control surface bottoms at flight angles of attack at and in excess of full stall;
   relatively small linear distances between the peripheral boundaries of said stagnation regions and the peripheral boundaries of said bottom surface areas; and
   substantially laminar fluid flow states prevailing adjacent said bottom surfaces between said stagnation regions and said bottom area pheripheral boundaries.

7. An aircraft as described in claim 6 wherein the sides of said fuselage are relatively convergent from said bottom and fluid flow separates from said fuselage, wing and control surfaces at said bottom area peripheries under said full stall attack angle flight conditions.

8. A reaction propulsion aerospace vehicle having:
   fixed position aerodynamic lifting and control surfaces;
   two positively statically stable trim attitudes at subsonic velocities, one stable trim attitude at an angle of attack exceeding 40 degrees and the other at an angle of less than 40 degrees; and
   sufficient pitching moment control means to selectively drive said vehicle pitch attitude between said two stable trim attitudes.

9. An aerospace vehicle as described in claim 8 wherein said vehicle is positively statically stable about pitch and roll fuselage reference axes and neutrally statically stable about a yaw axis coinciding with a relative wind axis in flight at said attack angle in excess of 40 degrees.

10. An aerospace vehicle as described in claim 9 wherein said vehicle is positively statically stable about a vehicle reference yaw axis in flight at said attack angle of less than 40 degrees.

11. A method of recovering a vehicle having fixed aerodynamic support and control surfaces from high altitudes and hypersonic velocities comprising:
    regulating the flight attitude of said vehicle throughout the hypersonic velocity region to attack the relative wind with a substantially maximum area profile;
    providing positive static pitch stability throughout said hypersonic velocity region by relating the lifting force from said relative wind to the angle of incidence of said vehicle over one portion thereof at a rate different from the remaining portion;
    generating a shock wave between the undisturbed atmospheric fluid and said attack area profile at a discrete distance ahead of said vehicle;
    conducting fluid flow behind said shock wave over said attack area surface at laminar flow states throughout said hypersonic velocity region;
    regulating the flight attitude of said vehicle throughout the subsonic velocity region to attack the relative wind with a substantially minimum profile;
    generating aerodynamic lift from said fixed aerodynamic support and control surfaces throughout said subsonic velocity region; and
    horizontally landing said vehicle in a substantially stall attitude.

12. A high attitude vehicle recovery method as described in claim 11 additionally comprising:
    substantially separating said fluid from said attack area surface at the peripheral boundary thereof throughout said hypersonic velocity region.

13. An aircraft having fuselage means fixed position wings and attitude control surfaces:
said fuselage having roll and pitch and first yaw axes relative thereto;
a second yaw axis parallel with the relative wind against said aircraft in flight and substantially intersecting the vehicle center of gravity; and
said aircraft being positively statically stable about said roll and pitch axes and neutrally statically stable about said second yaw axis in flight at full stall attack angle attitudes.

14. An aircraft as described in claim 13 also being positively statically stable about said first yaw axes in flight at angles of attack less than full stall.

15. An aircraft having fuselage and wing means:
the bottom of said fuselage being substantially flat over a first portion thereof, both longitudinally and transversely, whereby substantially uniform impact lifting pressures are imposed against said first portion of the bottom in full stall flight attitudes; and
said fuselage bottom having rigid structural means over a second portion thereof for effecting positive static pitch stability restoring moments on said aircraft in said full stall flight attitudes.

16. An aircraft as described in claim 15 also having means for positive static roll stability about a longitudinal fuselage axis and neutral static yaw stability about an axis parallel with the relative wind and substantially intersecting the aircraft center of gravity in said full stall flight attitudes.

17. An aircraft as described by claim 15 wherein said rigid structural means comprises longitudinally cambered surface means disposed along the leading end of said fuselage bottom.

References Cited
UNITED STATES PATENTS

| | | | |
|---|---|---|---|
| 3,104,079 | 9/1963 | Phillips | 244—155 |
| 3,132,825 | 5/1964 | Postle et al. | 244—155 |
| 3,369,771 | 2/1968 | Walley et al. | 244—155 |
| 3,058,691 | 10/1962 | Eggers et al. | 244—2 |
| 3,276,722 | 10/1966 | Eggers et al. | 244—155 |
| 3,090,580 | 5/1963 | Kehlet et al. | 244—155 |

EVON C. BLUNK, Primary Examiner

B. H. STONER, JR., Assistant Examiner

U.S. Cl. X.R.

244—2, 36, 90